United States Patent Office 3,194,631
Patented July 13, 1965

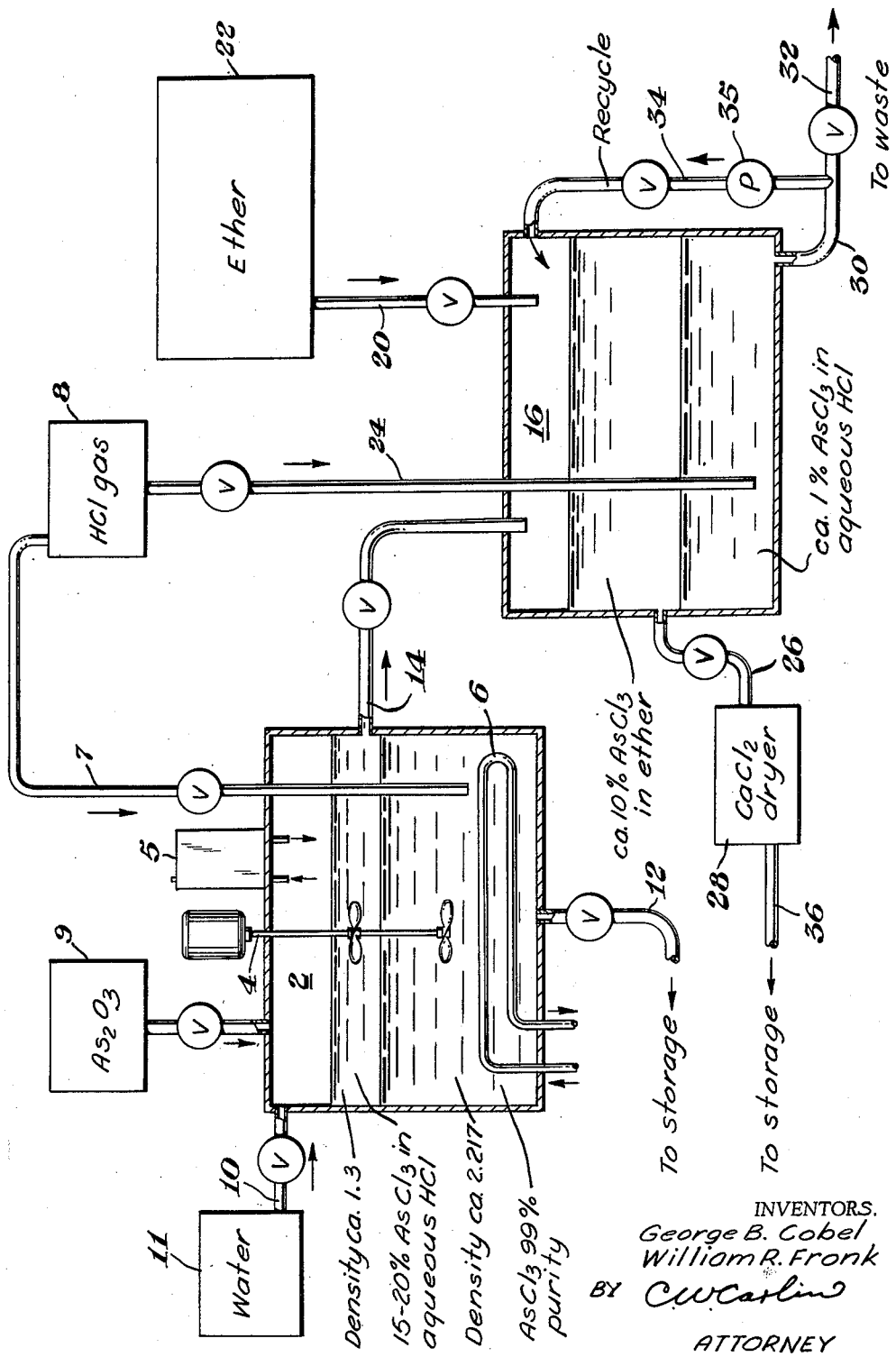

3,194,631
PROCESS OF PRODUCING HIGH PURITY ARSENIC TRICHLORIDE FROM A SLURRY OF $As_2O_3$
George B. Cobel, Midland, and William R. Fronk, Ann Arbor, Mich., assignors to The Dow Chemical Company, Midland, Mich., a corporation of Delaware
Filed Mar. 14, 1963, Ser. No. 265,100
7 Claims. (Cl. 23—98)

The invention herein described is an improved method of making arsenic trichloride.

Arsenic trichloride ($AsCl_3$) has extensive industrial and laboratory uses. Among such uses is that of an intermediate, e.g., as a reactant with diphenyl oxide to produce 10-chlorophenoxarsine, widely used as an insecticide and fungicide.

As in a number of other manufacturing operations, the economics thereof are much dependent on the cost and availability of the necessary beginning materials. Heretofore, neither the efficiency of known methods of preparing $AsCl_3$ nor the quality of the end product have been fully satisfactory.

A need, therefore, has existed for an improved method of making $AsCl_3$. The invention has fulfilled this need.

The steps for carrying out the method of the invention are described hereinbelow in reference to the annexed drawing showing a flowsheet, and by examples which are illustrative thereof, and are succinctly defined in the appended claims.

The invention is an improved method of making high purity $AsCl_3$ which consists of the steps of (1) slurrying $As_2O_3$ in water or aqueous hydrochloric acid, (2) passing hydrogen chloride through the resulting slurry to produce $AsCl_3$ in suspension, (3) allowing the reaction mixture to stand and stratify into substantially two layers: an upper aqueous phase saturated with $AsCl_3$ and containing some HCl and a lower liquid phase consisting of substantially all $AsCl_3$, (4) separating the two phases, e.g., by drawing off the lower phase or decanting off the upper phase, and (5) removing substantially all of the $AsCl_3$ from the aqueous phase, by solvent extraction, and optionally recovering $AsCl_3$ from the solvent portion of the extraction, as by evaporation, if desirable, or retaining the solvent extracted solution for use as it is.

In a preferred embodiment of the invention, the process is carried out in a semi-continuous manner wherein the aqueous phase produced in Step 3 above is divided into two portions, one portion being admixed with additional hydrochloric acid or HCl gas, as needed, to slurry additional $As_2O_3$ and only the other portion of the aqueous phase being subjected to solvent extraction to remove substantially all the $AsCl_3$ therefrom.

$As_2O_3$ may be prepared from a number of sources and by a number of methods. One often employed is that of roasting (i.e., heating in air) arsenopyrite, which is chiefly FeAsS and recovering the thus oxidized arsenic.

The temperature employed for the reaction between the $As_2O_3$ and HCl in the aqueous medium in the practice of the invention is between room temperature and about 100° C. Since the reaction is exothermic, it is usually started at room temperature or slightly above and thereafter the self-generated heat is controlled at between about 25° C. and about 75° C.

The upper aqueous layer (which may contain up to about 12% of the $AsCl_3$ theoretically possible based on the $As_2O_3$) usually consists of about 10 to 20% by weight $AsCl_3$. The lower $AsCl_3$ layer is free of water, tests sensitive to as little as 1 p.p.m. have not indicated the presence of any water. If substantially pure $As_2O_3$ is employed and fully reacted with HCl, there will be no other materials than $AsCl_3$, water, and some unreacted HCl present in the products made.

The entire quantity of the aqueous solution containing $AsCl_3$ is not usually employed in the preparation of additional batches or in a continuous process because there would thereby be provided an unwanted accumulation of water. The portion of the aqueous acidic solution of $AsCl_3$ used in succeeding reactions of the process is usually about one-half that produced in the preceding reaction, although the amount may be greater or less so long as the desired acid concentration is maintained.

The $AsCl_3$ in that portion of the aqueous acidic solution which is not reused in the process is recovered as aforesaid, from the aqueous acid medium by extracting it with a suitable organic solvent. Any aliphatic or aromatic solvent may be used so long as it is substantially water-immiscible and the $AsCl_3$ is soluble therein. The ratio of solvent to aqueous $AsCl_3$ usually employed is about 1:1 by volume but may be varied according to circumstances. An ether is commonly employed as the solvent and particularly diphenyl oxide (or diphenyl ether) which offer certain advantages over other ethers. After extraction, the organic solvent can then be removed from the $AsCl_3$ if desired. However, when an ether solution thereof is obtained, it need not be separated from the $AsCl_3$ because it may be useable as it is for important uses. For example, when diphenyl oxide is employed, the resulting $AsCl_3$ solution is useful in the manufacture of 1-chlorophenoxarsine. When such solution is subjected to proper reaction conditions, 10-chlorophenoxarsine is formed in accordance with the following equation:

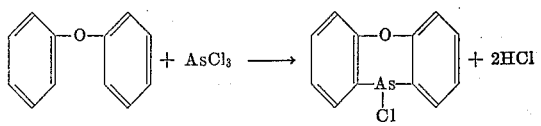

It is preferred to perform the ether extraction step under HCl gas pressure wherein the aqueous $AsCl_3$ is saturated with HCl since the solubility of $AsCl_3$ in ether is directly proportional to the HCl concentration.

A small amount of water, about 0.1% by weight when the extraction is carried out in a HCl atmosphere, may remain in the ether extract. This can conveniently be removed, if desired, by passing the ether extraction through a dessicant such as $CaCl_2$ or through Molecular Sieves, procurable from The Linde Company, New York, New York, or Micro Traps, procurable from W. R. Grace and Company, New York, New York.

The annexed drawing schematically shows one mode of practicing the process of the invention in a continuous process employing ether as the extractant.

The following procedure is illustrative of the practice of the invention in a semi-continuous process: apparatus is set up in the manner suggested by the flow sheet of the drawing wherein ether is employed as the extractant. It comprises: a suitable closed reaction vessel designated 2 provided with stirrer 4, condenser 5, cooling coil 6, inlet tube 7 from HCl gas source 8 which extends to a point near the bottom of the vessel, an inlet tube from a solid particulated $As_2O_3$ source 9, an inlet tube 10 from a water source 11, an outlet tube 12, at the bottom leading to storage and outlet tube 14 intermediate the bottom and top of vessel 2 leading to extraction vessel 16 (described more fully hereinbelow). Extraction vessel 16 is provided with two other inlets: tube 20 leading from ether source 22 and tube 24 leading from HCl gas source 8, and two outlets: tube 26 located intermediate the top and bottom of extraction vessel 16 leading to dryer 28 for removing water from the ether solution of $AsCl_3$, and a second outlet 30 which bifurcates into two branches: one branch 32 which leads to waste disposal and the second branch 34 having pump 35 therein, which constitutes a recycle system for returning liquid from the lower part of extraction vessel 16 to the upper part thereof. Tube 36 leads from dryer 28 to storage. All tubes are provided with appropriate valves, designated V, for flow control.

The invention may be carried out by a semi-continuous procedure or it may be carried out in a batch process. When following a semi-continuous procedure, apparatus of the nature of that shown in the drawing is assembled and necessary sources of $As_2O_3$, HCl, water, and ether are provided. The stirrer is started and water and $As_2O_3$ are admitted into the reaction vessel. HCl gas is then admitted until a highly concentrated hydrochloric acid (e.g., 20% to point of saturation) is produced in vessel 2. Since water will be produced by the ensuing reaction between $As_2O_3$ and HCl, the inflow of water is then discontinued. Additional $As_2O_3$ is admitted and slurried in the so produced acid solution while continuing the admission of HCl gas. The $As_2O_3$ reacts with the HCl to form two liquid phases: a lower $AsCl_3$ phase, at least about 99% pure $AsCl_3$, and an upper aqueous phase consisting by weight of about 15% to 20% dissolved $AsCl_3$. As the reaction proceeds, a vaporous mixture of HCl, $AsCl_3$, and water is present in the reaction vessel above the slurry. It is recommended that a condenser be provided having a small vent therein for condensing and returning a substantial portion of this vaporous mixture to the liquid reaction mixture in the reaction vessel. Since HCl gas is more soluble in water at lower temperatures and the reaction is exothermic, it may be desirable to provide a cooling means for the reaction mixture. The admission of HCl and $As_2O_3$ and stirring are periodically temporarily stopped. Sufficient of the lower $AsCl_3$ layer is drawn off, as through tube 12, to storage to maintain the desired level thereof in the reaction vessel and sufficient of the upper aqueous layer is drawn off into an extraction vessel such as vessel 16 where it is treated with a suitable water-immiscible organic solvent for $AsCl_3$ for a time sufficient to extract substantially all the $AsCl_3$ from the water. Improved extraction rate may be provided by means of a stirrer but it is preferred to recycle some of the lower aqueous phase into the upper organic phase. The aqueous portion from the extraction vessel is periodically drawn off to waste. The upper organic phase containing extracted $AsCl_3$ is drawn off and passed through a dryer to remove traces of remaining water, and is placed directly in storage for use.

The following example illustrates the practice of the invention by a batch process employing standard laboratory equipment: 132 grams (7.32 moles) of water at room temperature were placed in a 3-neck, 1000-liter flask, equipped with a stirrer, reflux condenser, and inlet tube leading to a point near the bottom of the water. Sufficient HCl gas to make a 36% by weight hydrochloric acid was admitted by way of the inlet tube. Stirring was started, 482 grams (2.44 moles) of $As_2O_3$ were then added to the vessel. The $As_2O_3$ was slurried in the so-produced hydrochloric acid and then additional HCl gas was admitted at a rate to provide a continuous stream thereof rising upwardly in the slurry. When the reaction was substantially completed the introduction of HCl and stirring were discontinued. A total of 534 grams (14.64 moles) of HCl gas were employed. Two liquid phases had formed during the reaction: an upper aqueous phase containing about 17.5% by weight of $AsCl_3$, and comprising 10% of the $AsCl_3$ theoretically possible based on the weight of $As_2O_3$ employed, and a lower phase consisting of about 99% $AsCl_3$, no detectable water, and comprising about 90% of the $AsCl_3$ theoretically possible based on the weight of $As_2O_3$ employed. Agitation was then stopped and the apparatus disassembled sufficiently to permit the upper aqueous phase to be decanted. About one-half of this was placed in a vessel provided with a HCl gas inlet line and containing a volume of diphenyl oxide equal to about the volume of the aqueous phase. The resulting mixture was shaken two times while passing HCl gases therethrough. An upper ether phase containing $AsCl_3$ was thereby formed which was decanted off and any entrapped water subsequently removed by drying.

As an alternative mode of recovering $AsCl_3$ from the aqueous phase, instead of shaking the aqueous phase from the reaction vessel in ether, is to place it in a suitable vessel provided with inlet lines for the solvent, e.g., ether, and HCl gas and provide controlled agitation or a recycle pump, periodically allow the contents to stratify, and draw off the upper stratum comprising $AsCl_3$ in ether, and usually some (e.g. 1%) entrapped water which is removed by passing through a dryer. The ether containing the $AsCl_3$ may then be stored for use, as in making 10-chlorophenoxarsine or, if the ether solution is not a desired end product, the ether extraction phase can be distilled to separate the $AsCl_3$ from the ether. If it is desired that the $AsCl_3$ be reduced below 1% in the aqueous solution, the ether extraction process may be repeated one or more times which reduces the $AsCl_3$ in the aqueous phase to an insignificantly small amount.

The other half of the aqueous $AsCl_3$ solution, which was not ether extracted in the above example, was reused in a succeeding batch as a source of HCl. This represents a substantial saving in consumption of fresh HCl, facilitates the slurrying of the $As_2O_3$, and further reduces the loss of $AsCl_3$ remaining in the aqueous phase.

It is to be understood that other suitable organic solvents than ethers may be used in either the semi-continuous or batch process.

The practice of the invention offers a number of advantages, salient among which are: improved economy and efficiency requiring lower costs and resulting in a higher quality product than that attained in heretofore known methods.

Having described our invention, what we claim and desire to protect by Letters Patent is:

1. A method of making high purity $AsCl_3$ which consists essentially of (1) slurrying $As_2O_3$ in an aqueous HCl solution of between 20 percent and the point of saturation, in a closed system, (2) passing HCl gas through the aqueous slurry so made to produce $AsCl_3$ in suspension at a temperature of between room temperature and about 100° C., (3) allowing the reaction mixture to cool and stratify into substantially two liquid layers: a lower layer comprising $AsCl_3$ and an upper aqueous layer containing dissolved $AsCl_3$, (4) separating the two layers, and (5) extracting $AsCl_3$ from the thus separated aqueous layer by admixing therewith an organic solvent for $AsCl_3$, which is substantially immiscible with water, and (6) separating the solvent containing a substantial portion of the $AcCl_3$ from the remaining aqueous portion.

2. A semi-continuous method of making high purity $AsCl_3$ which consists essentially of the steps of: (1) slurrying $As_2O_3$ in aqueous hydrochloric acid of between 20 percent and the point of saturation in a closed system, (2) passing anhydrous HCl gas through the aqueous acid slurry at a temperature of between room temperature and about 100° C. to produce $AsCl_3$ in suspension at a temperature of between room temperature and about 100° C., (3) allowing the reaction mixture to cool and stratify into substantially two liquid phases: a lower phase consisting of at least about 99% $AsCl_3$ by weight, and an upper aqueous acid phase containing dissolved $AsCl_3$, (4) separating the two phases, (5) admixing a portion of the aqueous acid phase with additional $As_2O_3$ and passing HCl gas therethrough to make more $AsCl_3$, and (6) extracting $AsCl_3$ from the other portion of the aqueous acid phase with an organic solvent which is substantially immiscible with water and in which $AsCl_3$ is soluble, and (7) separating the solvent containing the extracted $AsCl_3$ from the aqueous portion.

3. The method according to claim 2 wherein the solvent containing $AsCl_3$ extracted from the aqueous $AsCl_3$ solution is subjected to distillation to remove the solvent therefrom.

4. The method according to claim 2 wherein the organic solvent is an ether.

5. The method according to claim 4 wherein the ether is diphenyl oxide.

6. The method according to claim 5 wherein the diphenyl oxide containing the $AsCl_3$ dissolved therein is separated by volatilizing off the $AsCl_3$.

7. A method of making high purity $AsCl_3$ which consists essentially of (1) slurrying $As_2O_3$ in an aqueous HCl solution of between 20 percent and the point of saturation in a closed system, (2) passing HCl gas through the aqueous slurry so made at a temperature of between room temperature and about 100° C. to produce $AsCl_3$ in suspension, (3) allowing the reaction mixture to cool and stratify into substantially two liquid layers: a lower layer of at least about 99 percent by weight of $AsCl_3$ and an upper aqueous layer, and (4) recovering and retaining the lower $AsCl_3$ layer and discarding the upper aqueous layer.

References Cited by the Examiner
UNITED STATES PATENTS 2,383,105   8/45   Booth ------------------ 23—98

OTHER REFERENCES

"Handbook of Chemistry and Physics," by C. D. Hodgman, April 1962 edition, pages 536, 537; The Chemical Rubber Pub. Co., Cleveland, Ohio.

Comey and Hahn: "A Dictionary of Chemical Solubilities," Inorganic, 1921 edition, pages 53 and 54, MacMillan Co., New York.

MAURICE A. BRINDISI, *Primary Examiner.*